(12) United States Patent
Dhanakodi et al.

(10) Patent No.: US 11,294,926 B1
(45) Date of Patent: Apr. 5, 2022

(54) MASTER EXTRACT, TRANSFORM, AND LOAD (ETL) APPLICATION FOR ACCOMMODATING MULTIPLE DATA SOURCE TYPES HAVING DISPARATE DATA FORMATS

(71) Applicant: Facteus, Inc., Beaverton, OR (US)

(72) Inventors: Gopinath Dhanakodi, Portland, OR (US); Randy Koch, Portland, OR (US); Jonathan Chin, Portland, OR (US)

(73) Assignee: FACTEUS, INC., Beaverton, OR (US)

( * ) Notice: Subject to any disclaimer, the term of this patent is extended or adjusted under 35 U.S.C. 154(b) by 255 days.

(21) Appl. No.: 16/428,876

(22) Filed: May 31, 2019

(51) Int. Cl.
*G06F 16/00* (2019.01)
*G06F 16/25* (2019.01)
*G06F 9/46* (2006.01)

(52) U.S. Cl.
CPC ............ *G06F 16/254* (2019.01); *G06F 9/466* (2013.01); *G06F 16/258* (2019.01)

(58) Field of Classification Search
CPC .................................................. G06F 16/254
See application file for complete search history.

(56) References Cited

U.S. PATENT DOCUMENTS

| | | | |
|---|---|---|---|
| 7,509,671 B1* | 3/2009 | Bedell | G06F 9/5038 726/6 |
| 8,930,275 B2 | 1/2015 | Heizmann et al. | |
| 9,633,095 B2 | 4/2017 | Mehra et al. | |
| 10,133,797 B1* | 11/2018 | Mishra | G06F 16/254 |
| 10,235,537 B2 | 3/2019 | Erez | |
| 2002/0133468 A1* | 9/2002 | Mertens | G06Q 30/06 705/75 |
| 2005/0203857 A1* | 9/2005 | Friedman | G07F 7/0833 705/78 |
| 2006/0059140 A1* | 3/2006 | Noe | G06F 16/2365 |
| 2007/0011175 A1* | 1/2007 | Langseth | G06F 16/254 |
| 2010/0192220 A1* | 7/2010 | Heizmann | G06F 21/6254 726/19 |
| 2015/0186481 A1* | 7/2015 | Mehra | G06F 16/254 707/602 |
| 2015/0347539 A1* | 12/2015 | Holmes | G06F 16/972 707/602 |
| 2018/0336370 A1* | 11/2018 | Schonwald | G06F 21/6254 |
| 2018/0349991 A1* | 12/2018 | Fidanza | G06Q 20/363 |
| 2019/0141021 A1* | 5/2019 | Isaacson | G06Q 30/0625 |

FOREIGN PATENT DOCUMENTS

WO 2018194707 A1 10/2018

* cited by examiner

*Primary Examiner* — Ajith Jacob
(74) *Attorney, Agent, or Firm* — Stoel Rives LLP

(57) ABSTRACT

Disclosed are techniques for preparing data, received at unpredictable times from multiple data sources providing disparate proprietary data formats and input types, so that the data is readily available to be monetized, used for business analytics, or other purposes.

16 Claims, 24 Drawing Sheets

```
DOCS|ACTIVE|FIFFM|5D52AD779C31C55BE040210A18306074|2008-12-05
13:28:13.000000|8a6dd6ce64fd5f0401651fd92a811760|2018-10-18
05:56:13.672000|ROW_STATUS_DELETED|00002|Documentation|Documentation|
COOP_TENANT|2000000|20181019033242_PADB_CaseStatusCode.txt|2019-01-24
17:54:06|PAYPAL*WALMART COM|$52.10
INVESTIGATION|ACTIVE|FIFFM|5D52AD779C31C55BE040210A18306074|2008-12-05
13:28:13.000000|8a6dd6ce64fd5f0401651fd92a811760|2018-10-18
05:56:27.485000|ROW_STATUS_DELETED|00002|Investigation|Investigation|
COOP_TENANT|2000000|20181019033242_PADB_CaseStatusCode.txt|2019-01-24
17:54:06|SQ*Wal-Mart|$32.99
```

FIG. 2 dre.docs

- Dashboard
- My Data — 82
- Documentation
- Data Dictionaries

Data Overview

ARM Insight's data set includes daily transactions from 25 million active debit and credit cards from more than 850+ banks and credit unions. The sample data begins January 1, 2014 and continues through December 31, 2017 and includes over 10.2B+ transactions. There are several additional fields within this data set including: merchant name, zip code for merchant, zip code for cardholder, birth year for cardholder, online vs. offline transaction identifier, available credit, and date-time of the transaction.

Data Source$^{Credit}$

Debit vs Credit | Age of Cardholders — 110 | Geographic Panel Bias — 112

Cardholder Count: 700,000 / 600,000 / 500,000 / 400,000 / 300,000 / 200,000 / 100,000 / 0

USER LOGOUT

Data Source$^{Credit}$ — 108

Next Panel: 1:00 p.m. PST

| Date | File Name | Number of Rows | File Size | Missing Files | Missing Data |
|---|---|---|---|---|---|
| 08/08/18 12:00 p.m. PST | YodeleeReport123.csv | 123,456,789 Rows | 125 GB | | |
| 08/08/18 12:00 p.m. PST | YodeleeReport123.csv | 123,456,789 Rows | 125 GB | | |
| 08/08/18 12:00 p.m. PST | YodeleeReport123.csv | 123,456,789 Rows | 125 GB | | |
| 08/08/18 12:00 p.m. PST | YodeleeReport123.csv | 123,456,789 Rows | 125 GB | ☐ | |
| 08/08/18 12:00 p.m. PST | YodeleeReport123.csv | 123,456,789 Rows | 125 GB | | |
| 08/08/18 12:00 p.m. PST | YodeleeReport123.csv | 123,456,789 Rows | 125 GB | | ☐ |

Data Compliance Overview
NDA & Data Evaluation
Submit Your AWS User ARN

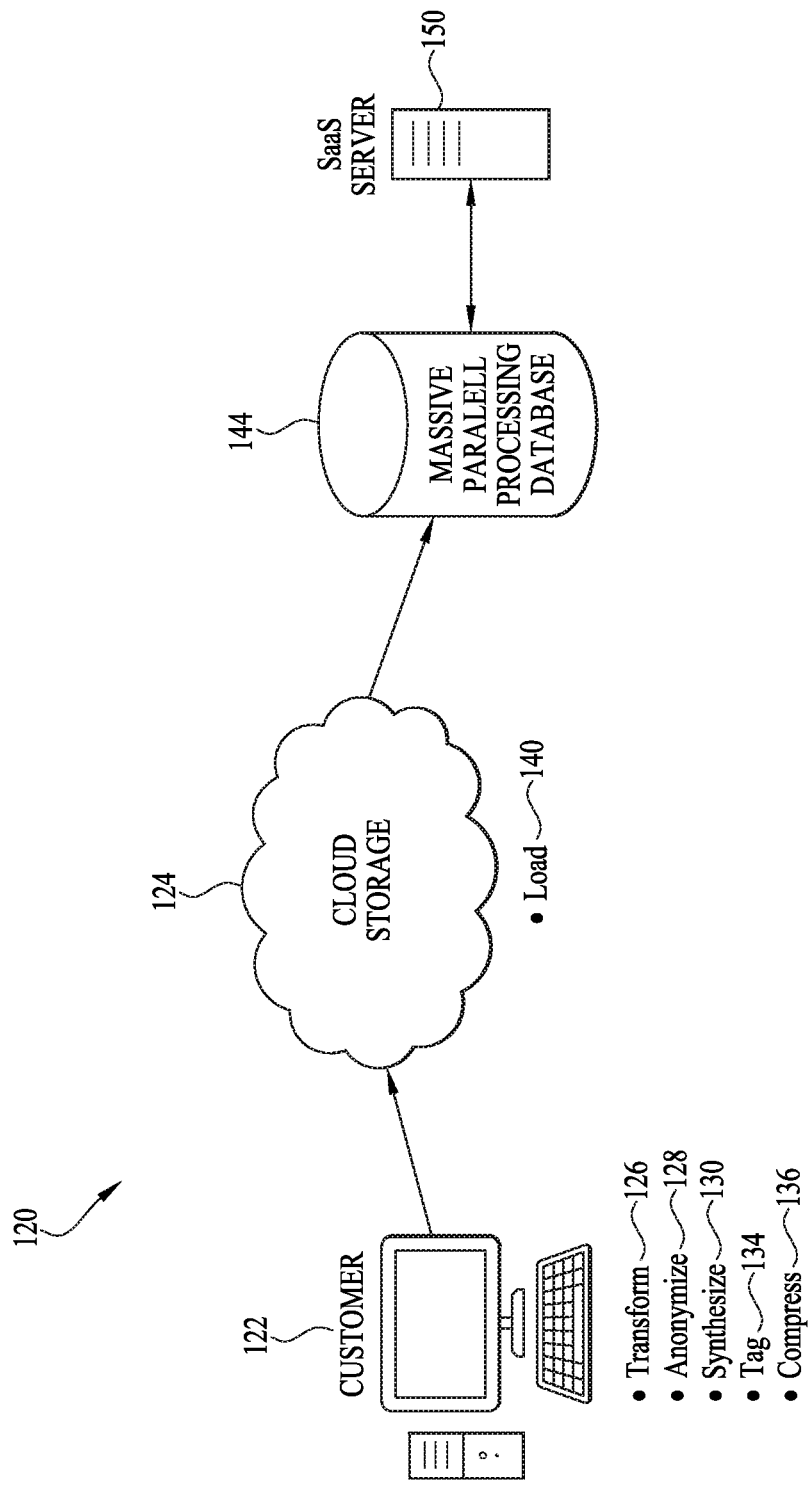

```
{
  "AWS": {                                    ⟵ 162
    "Region": "us-east-1",
    "AccessKey": "xxxxxxxxxxxx",
    "SecretKey": "xxxxxxxxxxxxxx"
  },
  "AWSPipeLine": {                            ⟵ 162
    "PipeLineId": "xxxxxxxxxxxxxx"
  },
  "Google": {                                 ⟵ 162
    "GCSCredentialsFilePath": "C:\\Projects\\Pattern Analytics ETL\\PatternAnalyticsETL\\access\\asdervv.json"
  },
  "DBUserCredentials": {                      ⟵ 162
    "UserName": "xxxxxxxxx",
    "Password": "xxxxxxxxxxxxxxx"
  },
  "DirectorySettings": {                      ⟵ 164
    "FileSettingsConfigFile": "C:\\hat\\DataMint\\config\\MinDataConfigDev_old.txt",   ⟵ 166
    "SrcDir": "C:\\hat\\DataMint\\Test\\SourceDir\\",
    "DestinationDir": "C:\\hat\\DataMint\\Test\\DestinationDir\\",
    "ShipDir": "C:\\hat\\DataMint\\Test\\ShipDir\\",
    "FailedDir": "C:\\hat\\DataMint\\Test\\FailedDir\\",
    "DBQueriesBaseFolder": "C:\\hat\\DataMint\\config\\JobQueries\\"
  },
}
```
⟵ 160

FIG. 6A

```
"GlobalSettings": {
    "BufferSize": "524288",
    "ParallelProcess": "true",
    "DeleteFiles": "true",
    "ProcessFiles": "true",
    "CompressFiles": "true", "ShipFiles": "true",
    "LoadFilesToDB": "true",
    "TargetDB": "RedShift",
    "SendFileStat": "false",
    "RunDBQueries": "false",
    "DBQueryTiers": "3",
    "UseDataPipeLine": "false",
    "DeleteFilesFromCloudStorage": "true"
},
"StatFileSettings": {
    "Host": "xxxxxxx",
    "Database": "dbapdev",
    "TableId": "dailyfilestat",
    "BucketName": "dbap-dev/filestat/",
    "ObjName": "dbapfilestat.csv",
    "TargetFolder": "C:\\hat\\DataMint\\FileStat\\"
```

FIG. 6B

```
{
  "EmailSettings": {          ~182
    "SmtpServer": "xxxxxxx",
    "SmtpPort": "1234",
    "Username": "xxxxxxxxxx",
    "password": "xxxxxxxxxxxx",
    "FromAddress": "xxxxxxxxxxxx",
    "ToAddress": "xxxxxxxxxxxxxxxx",
    "Subject": "Daily XYZ File Statistics"
  },
  "Logging": {          ~184
    "LoggerType": "xxxx",
    "GCSCredentialsFilePath": "C:\\Projects\\Pattern Analytics ETL\\PatternAnalyticsETL\\access\\dsdsds.json",
    "LogFilePath": "C:\\hat\\DataMint\\Test\\Log\\Log.txt",
    "ProductName": "DataMint",
    "ProjectId": "xxxxxxxxxxx"
  },
  "CustomFileSettings": {          ~186
    "MoneyCodeConversionConfigFile": "C:\\Projects\\YaltAnalytics\\YaltAnalyticsETL\\YaltAnalyticsETL\\Config\\MoneyCodeConversionConfig.txt",  ~190
    "ZipCensorTractMapFile": "C:\\hat\\DataMint\\ZipTractMap.json",   ~192
    "PaymentAgentPatternFile": "c:\\hat\\PaymentAgentPatterns.json",   ~194
    "MerchantPatternFile": "c:\\hat\\MerchantPatterns.json"   ~196
  }
}
```

*Fig. 6C*

```
{"FileSettings":
    [
        {
        "CommonFileSetting":              ~222
            {
            "FileIndicators":
                [
                    {"Name":"ARM_FraudCustomer"}
                ],
            "MaxLineLength":"4111",
            "MinLineLength":"0",
            "BatchSize":"100000",          ~232
            "InputFieldDelimeter":"",      ~224
            "OutputFieldDelimeter":"|",
            "HashSensitiveFields":"true",
            "DestinationLocation":"anonymize-data-dev/customer",
   244~   "SplitFile":"true",             ~234
            "LinesPerFile":"3000000",
   236~   "HeaderRowsToSkip":"0",
            "ShipCloudDestination":"S3",
            "DestinationHost":"padb-dev.coqojofotdth.us-east-1.redshift.amazonaws.com",
            "DestinationDB":"datasourcedatamonetize",
            "DestinationDBTable":"customer_staging",
            "WriteBehavior":"WriteTruncate",
            "DataFields":
     230~       [
                    {"Name":"ACCOUNT_REFERENCE_XID","Length":40,"FieldPos":1},
                    {"Name":"ADDRESS_LINE_1_STRG","Length":80,"FieldPos":57},
                    {"Name":"ADDRESS_LINE_2_STRG","Length":80,"FieldPos":137},
```

```
{"Name":"CELL_PHONE_NUM","Length":40,"FieldPos":849},
{"Name":"CITY_NAME","Length":60,"FieldPos":929},
{"Name":"COUNTRY_REGION_XCD","Length":40,"FieldPos":1089},
{"Name":"COUNTRY_XCD","Length":40,"FieldPos":1169},
{"Name":"CUSTOMER_BIRTH_DT","Length":10,"FieldPos":1330},
{"Name":"CUSTOMER_GENDER_XCD","Length":40,"FieldPos":1340},
{"Name":"CUSTOMER_XID","Length":40,"FieldPos":1420},
{"Name":"FIRST_NAME","Length":60,"FieldPos":1792},
{"Name":"HOME_PHONE_NUM","Length":40,"FieldPos":1856},
{"Name":"LAST_NAME","Length":60,"FieldPos":1969},
{"Name":"POSTAL_XCD","Length":40,"FieldPos":2402},
{"Name":"RCD_CRT_DTTM","Length":26,"FieldPos":2556},
{"Name":"WORK_PHONE_NUM","Length":40,"FieldPos":3991},
{"Name":"BIN_DERIVED","Length":0,"FieldPos":0},
{"Name":"TAG_SOURCE_FILENAME","Length":0,"FieldPos":0},
{"Name":"TAG_PROCESS_TIME","Length":0,"FieldPos":0}
],
"SensitiveFields":
[
    {"Name":"ACCOUNT_REFERENCE_XID"},         ⎯ 240
    {"Name":"CUSTOMER_XID"}
],
"CustomFileSetting":                           ⎯ 250
{
"ConvertToDateTimeFields":
[
    {"Name":"RCD_CRT_DTTM","Format":"yyyy-mm-dd hh.mm.ss.ms",    ⎯ 252
    "MaxReplaceLength":"19","ReplaceIn":":","ReplaceOut":":"}
],
```

```
{
  "YearFromDateFields": [ ~254
    {"Name":"CUSTOMER_BIRTH_DT"}
  ],
  "ConvertPIIFields": [ ~256
    {"Name":"FIRST_NAME",        "Type":"Name",    "Format":""},
    {"Name":"LAST_NAME",         "Type":"Name",    "Format":""},
    {"Name":"ADDRESS_LINE_1_STRG","Type":"Address", "Format":""},
    {"Name":"ADDRESS_LINE_2_STRG","Type":"Address", "Format":""},
    {"Name":"CELL_PHONE_NUM",    "Type":"Phone",   "Format":""},
    {"Name":"HOME_PHONE_NUM",    "Type":"Phone",   "Format":""},
    {"Name":"WORK_PHONE_NUM",    "Type":"Phone",   "Format":""}
  ],
  "ZipTractMapFields": [
    {"Name":"POSTAL_XCD"}
  ],
                    ~270
  "DerivedFileSetting": {
  },
  "PartialValueFields": [
    "DerivedFieldMap" : { "SourceFields" : [ {"Field" : "CUSTOMER_XID" } ], "TargetField" : "BIN_DERIVED" },
    "NoOfChars" : "6" ,
    "StartPos" : "0"
  ]
}
```

```
"CommonFileSetting": ⟵280
{
  "FileIndicators":
  [
    {"Name":"ARM_ImportCreditAuthPost"}
  ],
  "MaxLineLength":"1964",
  "MinLineLength":"0",
  "BatchSize":"100000",
  "InputFieldDelimeter":"|",
  "OutputFieldDelimeter":"|",
  "HashSensitiveFields":"true",
  "DestinationLocation":"anonymize-data-dev/creditauthpost",
  "SplitFile":"false",
  "LinesPerFile":"3000000",
  "HeaderRowsToSkip":"0",
  "ShipCloudDestination":"S3",
  "DestinationHost":"padb-dev.coqojofotdth.us-east-1.redshift.amazonaws.com",
  "DestinationDB":"datasourcedatamonetize",
  "DestinationDBTable":"credit_authpost_staging",
  "WriteBehavior":"WriteTruncate",
  "DataFields":
  [
    {"Name":"ACCOUNT_EXPIRATION_DT","Length":10,"FieldPos":1},
    {"Name":"ACCOUNT_REFERENCE_XID","Length":40,"FieldPos":11},
    {"Name":"ACQUIRER_COUNTRY_XCD","Length":3,"FieldPos":51},
    {"Name":"ACQUIRER_MERCHANT_XID","Length":40,"FieldPos":54},
    {"Name":"ACQUIRER_XID","Length":40,"FieldPos":94},
```

```
{"Name":"AUTHORIZATION_POSTING_XCD","Length":1,"FieldPos":189},
{"Name":"CARD_EXPIRATION_DT","Length":10,"FieldPos":317},
{"Name":"CARD_ISSUE_DT","Length":10,"FieldPos":328},
{"Name":"CARD_OPEN_DT","Length":10,"FieldPos":342},
{"Name":"CARD_TYPE_XCD","Length":1,"FieldPos":445},
{"Name":"CARDHOLDER_PRESENT_XFLG","Length":1,"FieldPos":456},
{"Name":"DECISION_XCD","Length":1,"FieldPos":723},
{"Name":"FL_TRANSACTION_ID","Length":32,"FieldPos":782},
{"Name":"SICCODE","Length":4,"FieldPos":929},
{"Name":"MERCHANT_CITY_NAME","Length":60,"FieldPos":933},
{"Name":"MERCHANT_COUNTRY_XCD","Length":3,"FieldPos":993},
{"Name":"MERCHANTDESC","Length":60,"FieldPos":997},
{"Name":"MERCHANT_POSTAL_XCD","Length":40,"FieldPos":1057},
{"Name":"MERCHANT_STATE_XCD","Length":3,"FieldPos":1097},
{"Name":"MERCHANT_XID","Length":40,"FieldPos":1100},
{"Name":"PORTFOLIO_NAME","Length":60,"FieldPos":1200},
{"Name":"PRIMARY_CARD_USE_XCD","Length":1,"FieldPos":1264},
{"Name":"TERMINAL_TYPE_XCD","Length":1,"FieldPos":1457},
{"Name":"TERMINAL_XID","Length":40,"FieldPos":1458},
{"Name":"TRANSACTION_AMT","Length":13,"FieldPos":1541},
{"Name":"TRANSACTION_CASHBACK_AMT","Length":13,"FieldPos":1554},
{"Name":"TRANSACTION_CATEGORY_XCD","Length":1,"FieldPos":1567},
{"Name":"TRANSACTION_DTTM","Length":26,"FieldPos":1574},
{"Name":"TRANSACTION_ISO_CURRENCY_XCD","Length":3,"FieldPos":1600},
{"Name":"TRANSACTION_PIN_VERIFY_XCD","Length":1,"FieldPos":1603},
{"Name":"TRANSACTION_POSTING_DT","Length":10,"FieldPos":1606},
{"Name":"TRANSACTION_POSTING_ENTRY_XFLG","Length":1,"FieldPos":1616},
{"Name":"TRANSACTION_TYPE_CD","Length":1,"FieldPos":1617},
{"Name":"USER_DATA_6_NUM","Length":40,"FieldPos":1800},
{"Name":"PAYMENTAGENTDERIVED","Length":0,"FieldPos":0},
```

```
{
  "SensitiveFields": [
    {"Name":"TAG_SOURCE_FILENAME", "Length":0, "FieldPos":0},
    {"Name":"TAG_PROCESS_TIME", "Length":0, "FieldPos":0}
  ],
  "CustomFileSetting": {
    [
      {"Name":"ACCOUNT_REFERENCE_XID"},
      {"Name":"ACQUIRER_MERCHANT_XID"},
      {"Name":"ACQUIRER_XID"},
      {"Name":"MERCHANT_XID"}
    ],
    "ConvertToDateTimeFields": [
      {"Name":"TRANSACTION_DTTM", "Format": "yyyy-mm-dd hh.mm.ss.ms",
       "MaxReplaceLength":"19", "ReplaceIn":"-", "ReplaceOut":":."}
    ],
    "YearFromDateFields": [
      {"Name":"ACCOUNT_EXPIRATION_DT"},
      {"Name":"CARD_EXPIRATION_DT"},
      {"Name":"CARD_OPEN_DT"}
    ],
    "RemoveCardNumberFields": [
      {"Name":"MERCHANT_NAME"}
    ]
  },
  "DerivedFileSetting":
}
```

FIG. 7F

```
{
    "PaymentAgentTagFields": 
    [                                                                              ⎯274
    ],
    "SourceFields" : [ {"Field" : "MERCHANTDESC" }, {"Field" : "SICCODE" } ], "TargetField" : "PAYMENTAGENTDERIVED" }
},
"SynthesizeFileSetting":                                          ⎯290
{
    "SynthesizeFields":
    [
        {"Name":"TRANSACTION_AMT",      "Type":"Amount",    "MinRange":"-2.5",   "MaxRange":"2.5"},
        {"Name":"TRANSACTION_DTTM", "Type" : "DateTime",    "MinRange":"-900",   "MaxRange":"-900"},
        {"Name":"MERCHANTDESC",   "Type":"MerchantDesc",    "MinRange":"0",      "MaxRange":"5"}
    ]
},
"CommonFileSetting":
{
    "FileIndicators":
    [
        {"Name":"ARM_ImportDebitAuthPost"}
    ],
    "MaxLineLength":"2246",
    "MinLineLength":"0",
    "BatchSize":"100000",
    "InputFieldDelimiter":",",
    "OutputFieldDelimiter": "|",
    "HashSensitiveFields": "true",
    "DestinationLocation":"anonymize-data-dev/debitauthpost",
```

```
"SplitFile": "false",
"LinesPerFile":"3000000",
"HeaderRowsToSkip":"0",
"ShipCloudDestination":"S3",
"DestinationHost":"padb-dev.coqojofotdth.us-east-1.redshift.amazonaws.com",
"DestinationDB":"datasourcedatamonetize",
"DestinationDBTable":"debit_authpost_staging",
"WriteBehavior":"WriteTruncate",
"DataFields":
[
    {"Name":"ACCOUNT_EXPIRATION_DT","Length":10,"FieldPos":1},
    {"Name":"ACCOUNT_REFERENCE_XID","Length":40,"FieldPos":11},
    {"Name":"ACQUIRER_COUNTRY_XCD","Length":3,"FieldPos":51},
    {"Name":"ACQUIRER_MERCHANT_XID","Length":40,"FieldPos":54},
    {"Name":"ACQUIRER_XID","Length":40,"FieldPos":94},
    {"Name":"AUTHORIZATION_POSTING_XCD","Length":1,"FieldPos":508},
    {"Name":"CARD_EXPIRATION_DT","Length":10,"FieldPos":637},
    {"Name":"CARD_ISSUE_DT","Length":10,"FieldPos":648},
    {"Name":"CARD_OPEN_DT","Length":10,"FieldPos":662},
    {"Name":"CARD_TYPE_XCD","Length":1,"FieldPos":741},
    {"Name":"CARDHOLDER_PRESENT_XFLG","Length":1,"FieldPos":752},
    {"Name":"DECISION_XCD","Length":1,"FieldPos":978},
    {"Name":"FL_TRANSACTION_ID","Length":32,"FieldPos":1037},
    {"Name":"SICCODE","Length":4,"FieldPos":1217},
    {"Name":"MERCHANT_CITY_NAME","Length":60,"FieldPos":1221},
    {"Name":"MERCHANT_COUNTRY_XCD","Length":3,"FieldPos":1281},
    {"Name":"MERCHANTDESC","Length":60,"FieldPos":1285},
    {"Name":"MERCHANT_POSTAL_XCD","Length":40,"FieldPos":1345},
    {"Name":"MERCHANT_STATE_XCD","Length":3,"FieldPos":1385},
    {"Name":"MERCHANT_XID","Length":40,"FieldPos":1388},
```

FIG. 7H

```
{"Name":"PORTFOLIO_NAME","Length":60,"FieldPos":1488},
{"Name":"PRIMARY_CARD_USE_XCD","Length":1,"FieldPos":1552},
{"Name":"TERMINAL_TYPE_XCD","Length":1,"FieldPos":1745},
{"Name":"TERMINAL_XID","Length":40,"FieldPos":1746},
{"Name":"TRANSACTION_AMT","Length":13,"FieldPos":1829},
{"Name":"TRANSACTION_CASHBACK_AMT","Length":13,"FieldPos":1842},
{"Name":"TRANSACTION_CATEGORY_XCD","Length":1,"FieldPos":1855},
{"Name":"TRANSACTION_DTTM","Length":26,"FieldPos":1856},
{"Name":"TRANSACTION_ISO_CURRENCY_XCD","Length":3,"FieldPos":1882},
{"Name":"TRANSACTION_PIN_VERIFY_XCD","Length":1,"FieldPos":1885},
{"Name":"TRANSACTION_POSTING_DT","Length":10,"FieldPos":1888},
{"Name":"TRANSACTION_POSTING_ENTRY_XFLG","Length":1,"FieldPos":1898},
{"Name":"TRANSACTION_TYPE_CD","Length":48,"FieldPos":1899},
{"Name":"USER_DATA_6_NUM","Length":40,"FieldPos":2082},
{"Name":"PAYMENTAGENTDERIVED","Length":0,"FieldPos":0},
{"Name":"TAG_SOURCE_FILENAME","Length":0,"FieldPos":0},
{"Name":"TAG_PROCESS_TIME","Length":0,"FieldPos":0}
],
"SensitiveFields":
[
    {"Name":"ACCOUNT_REFERENCE_XID"},
    {"Name":"ACQUIRER_MERCHANT_XID"},
    {"Name":"ACQUIRER_XID"},
    {"Name":"MERCHANT_XID"}
]
},
"CustomFileSetting":
{
"ConvertToDateTimeFields":
[
```

```
{
"MaxReplaceLength":"19", "ReplaceIn":"...", "ReplaceOut":"..."},
    {"Name":"TRANSACTION_DTTM", "Format": "yyyy-mm-dd hh.mm.ss.ms",
    },
"YearFromDateFields":
    [
    {"Name":"ACCOUNT_EXPIRATION_DT"},
    {"Name":"CARD_EXPIRATION_DT"},
    {"Name":"CARD_OPEN_DT"}
    ],
"RemoveCardNumberFields":
    [
    {"Name":"MERCHANT_NAME"}
    ],
"DerivedFileSetting":
    {
"PaymentAgentTagFields":
    [
    "SourceFields":[ {"Field" : "MERCHANTDESC" }, {"Field" : "SICCODE" } ], "TargetField" : "PAYMENTAGENTDERIVED" }
    ],
"SynthesizeFileSetting":
    {
"SynthesizeFields":
    [
    {"Name":"TRANSACTION_AMT",       "Type":"Amount",       "MinRange":"-2.5",   "MaxRange":"2.5"},
    {"Name":"TRANSACTION_DTTM", "Type":"DateTime",    "MinRange":"-900",  "MaxRange":"900"},
    {"Name":"MERCHANTDESC",      "Type":"MerchantDesc", "MinRange":"0",      "MaxRange":"5"}
    ]
}
}
```

FIG. 7J

```
{
    "CommonFileSetting":
    {
        "FileIndicators":
        [
            {"Name":"Arm_FraudPaymentInstrument"}
        ],
        "MaxLineLength":"1921",
        "MinLineLength":"0",
        "BatchSize":"100000",
        "InputFieldDelimeter":",",
        "OutputFieldDelimeter":"|",
        "HashSensitiveFields": "true",
        "DestinationLocation":"anonymize-data-dev/paymentinstrument",
        "SplitFile": "false",
        "LinesPerFile":"3000000",
        "HeaderRowsToSkip":"0",
        "ShipCloudDestination":"S3",
        "DestinationHost":"padb-dev.coqojofotdth.us-east-1.redshift.amazonaws.com",
        "DestinationDB":"datasourcedatamonetize",
        "DestinationDBTable":"payment_instrument_staging",
        "WriteBehavior":"WriteTruncate",
        "DataFields":
        [
            {"Name":"CUSTOMER_XID","Length":40,"FieldPos":633},
            {"Name":"FI_TRANSACTION_ID","Length":32,"FieldPos":793},
            {"Name":"PAYMENT_ID_CNT","Length":6,"FieldPos":1034},
            {"Name":"TRANSACTION_DTTM","Length":26,"FieldPos":1459},
            {"Name":"TRANSACTION_TYPE_CD","Length":48,"FieldPos":1488},
```

FIG. 7K

```
    {"Name":"USER_DATA_6_NUM","Length":40,"FieldPos":1631},
    {"Name":"BIN_DERIVED","Length":0,"FieldPos":0},
    {"Name":"TAG_SOURCE_FILENAME","Length":0,"FieldPos":0},
    {"Name":"TAG_PROCESS_TIME","Length":0,"FieldPos":0}
  ],
  "SensitiveFields":
  [
    {"Name":"CUSTOMER_XID"}
  ],
  "CustomFileSetting":
  {
    "ConvertToDateTimeFields":
    [
      {"Name":"TRANSACTION_DTTM","Format": "yyyy-mm-dd hh.mm.ss.ms",
"MaxReplaceLength":"19","ReplaceIn":" ","ReplaceOut":":"}
    ],
    "DerivedFileSetting":
    {
      "PartialValueFields":
      [
        {
          "DerivedFieldMap" : { "SourceFields" : [ {"Field" : "CUSTOMER_XID" } ], "TargetField" : "BIN_DERIVED" },
          "NoOfChars", "6",
          "StartPos" : "0"
        }
      ]
    }
  }
}
```

FIG. 7L

```
[
  {
    "Host": "",
    "Database": "",
    "Frequency": "Daily",
    "Day": "0",
    "StartTime" : "11:00:00",
    "EndTime"   : "11:59:00",
    "WriteBehavior": "WriteTruncate",
    "Name":"padb_auth_billing_truncate",
    "TableId": "",
    "QueryString":"truncate table adr"
  },
  {
    "Host": "",
    "Database": "",
    "Frequency": "Weekly",
    "Day": "0",
    "StartTime" : "11:00:00",
    "EndTime"   : "11:59:00",
    "WriteBehavior": "WriteAppend",
    "Name":"padb_auth_billing_history",
    "TableId": "",
    "QueryString":"INSERT INTO adf
SELECT  acct_nbr,crd_port,client_xid,user_data_6,case_number,trn_pos_ent_cd,trn_typ,
case when crd_port like 'CUA%' then dateadd(hr,2,trn_dt) else trn_dt end,
trn_amt,deci_cd,decision_xcd,rltm_req,pad_response,
case when aa_frd_scor <> 0 then aa_frd_scor else frd_scor end,
modl_used,trn_curr_cd,trn_curr_conv,trn_pin_vrfy_cd,trn_cvv_vrfy_cd,trn_pos_ent_cd,
crd_psnt_ind,cat_type_xflg,avs_response,sic_cd,mer_id,mer_nm,mer_cty,mer_st,mer_cnty_cd,
```

```
    mer_zip,card_credit_limit_amt,aval_cr,crd_opn_dt,crd_exp_dt,acct_exp_dt,PIS_issue_dt,
    crd_issue_type,cus_card_typ,primary_card_use_xcd,customer_card_cnt,card_postal_xcd,
    card_country_xcd,cas_supr_ind,ext_scor1,ext_scor2,ext_scor3,usr_ind_1,usr_ind_2,usr_ind_3,
    usr_ind_4,usr_dat_1,usr_dat_2,usr_dat_3,last_comp_event,usr_dat_5,prod_ruls_cas,prod_ruls_trn,
    transaction_tag,fi_transaction_id,lst_upd_dt,create_ts,
    cast(trn_dt as date) as BillingDate,getdate() as ReportDate
    from bn
    where (substring(lst_upd_dt,1,10) = cast(dateadd(day,-1,dateadd(hour,+1,getdate())) as date)
    or substring(create_ts,1,10) = cast(dateadd(day,-1,dateadd(hour,+1,getdate())) as date))
    and cast(load_key as integer) > 999999 and crd_port <> ''
    and user_data_6 <> '0';
},
"Host":"padb-dev.coqojofotdth.us-east-1.redshift.amazonaws.com",
"Database":"Monthly",
"Frequency":"",
"Day":"0",
"StartTime" : "11:00:00",
"EndTime"   : "11:59:00",
"WriteBehavior": "WriteTruncate",
"Name":"",
"TableId":"",                            ~302
"QueryString":" INSERT INTO abc
    SELECT  acct_nbr,crd_port,client_xid,user_data_6,case_number,trn_pos_ent_cd,trn_typ,
    case when crd_port like 'CUA%' then dateadd(hr,2,trn_dt) else trn_dt end,
    trn_amt,deci_cd,decision_xcd,rltm_req,pad_response,
    case when aa_frd_scor <> 0 then aa_frd_scor else frd_scor end,
    modl_used,trn_curr_cd,trn_curr_conv,trn_pin_vrfy_cd,trn_cvv_vrfy_cd,trn_pos_ent_cd,
    crd_psnt_ind,cat_type_xflg,avs_response,sic_cd,mer_id,mer_nm,mer_cty,mer_st,mer_cnty_cd,
    mer_zip,card_credit_limit_amt,aval_cr,crd_opn_dt,crd_exp_dt,acct_exp_dt,PIS_issue_dt,
```

FIG. 8B 300
302

```
{
crd_issue_type,cus_card_typ,primary_card_use_xcd,customer_card_cnt,card_postal_xcd,
card_country_xcd,cas_supr_ind,ext_scor1,ext_scor2,ext_scor3,usr_ind_1,usr_ind_2,usr_ind_3,
usr_ind_4,usr_dat_1,usr_dat_2,usr_dat_3,last_comp_event,usr_dat_5,prod_ruls_cas,prod_ruls_trn,
transaction_tag,fi_transaction_id,lst_upd_dt,create_ts
from bn
where (substring(lst_upd_dt,1,10) = cast(dateadd(day,-1,dateadd(hour,+1,getdate())) as date)
or substring(create_ts,1,10) = cast(dateadd(day,-1,dateadd(hour,+1,getdate())) as date))
and cast(load_key as integer) > 999999 and crd_port <> ''
and user_data_6 <> '0';
}
```

*Fig. 8C*

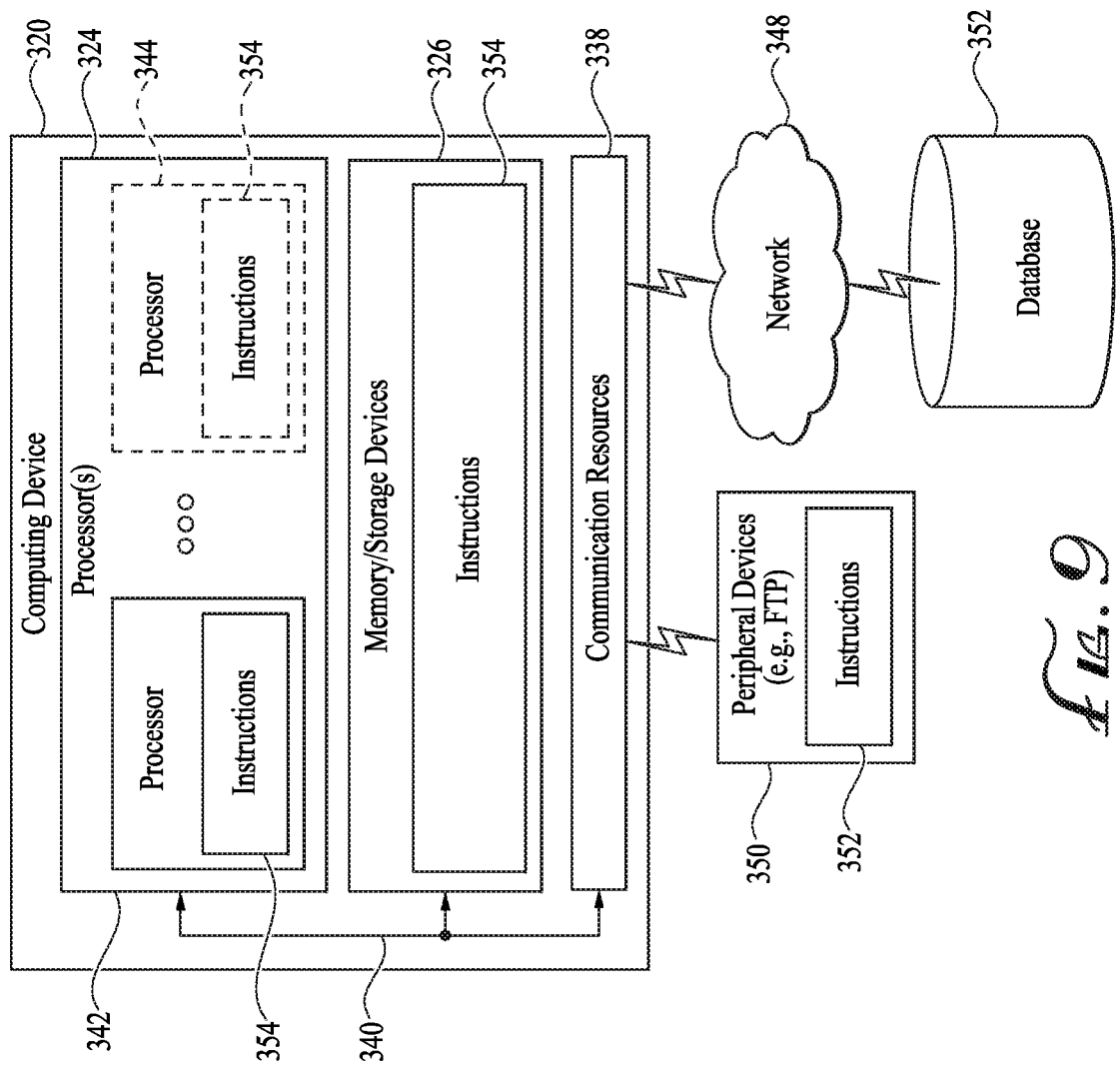

MASTER EXTRACT, TRANSFORM, AND LOAD (ETL) APPLICATION FOR ACCOMMODATING MULTIPLE DATA SOURCE TYPES HAVING DISPARATE DATA FORMATS

TECHNICAL FIELD

This disclosure relates generally to extract, transform, load (ETL) systems and, more particularly, to cleaning data into a standard format preparatory to loading it in a database.

BACKGROUND INFORMATION

In computing, extract, transform, load (ETL) is the general procedure of copying data from one or more sources into a destination system which represents the data differently from the source(s). The term is based on three steps: extracting (selecting and exporting) data from the source, transforming the way the data is represented to a form expected by the destination, and loading (reading or importing) the transformed data into the destination system.

A disadvantage of previously attempted ETL designs is that they are intended to operate on specific type of data input (e.g., a text file) having an understood and compatible format (e.g., comma separated values in fixed-length structured data fields). When the data format is changed, then the ETL software (or simply, ETL) is rewritten and compiled to accommodate the change. This limits the flexibility of conventional ETLs and increases maintenance costs since each data source provider typically has its own data format.

Instead of rewriting an ETL, some other attempts simply avoid preload transformations. For example, a variant of ETL is an extract, load, transform (ELT) system, thought the ETL/ELT terms are sometime used as synonyms. In an ELT system, however, extracted data is loaded into a target database before transformations are performed. Thus, ELT systems allow businesses to forgo preload transformations and replicate raw data into their data warehouses, where it can be transformed as needed using SQL commands. The data itself is usually loaded as string data, even though the data could be more efficiently represented in its native format including dates, numbers, and other types of non-string data formats.

Cloud-based data warehouses like Amazon Redshift, Google BigQuery, and Snowflake Computing provide highly scalable computing power capable of accommodating some post-load transformations, but at increased cost and reduced speed.

SUMMARY OF THE DISCLOSURE

Disclosed are techniques for preparing data, received at unpredictable times from multiple data sources providing disparate proprietary data formats and input types, so that the data is readily available to be monetized, used for business analytics, or other purposes.

Some embodiments entail, for each data source providing an associated proprietary format financial transaction data input, configuring a corresponding instance of the master ETL application with application settings configuration information, the application settings configuration information identifying a cloud storage resource and a cloud database, a location in which the associated proprietary format financial transaction data input is to be delivered, a location of data-transformation settings configuration information, and a location of job settings configuration information specifying preconfigured queries to run in one or more hierarchical job tiers; in response to receiving the associated proprietary format financial transaction data input, processing it based on the data-transformation settings configuration information identified by the application settings configuration information, the data-transformation settings configuration information specifying instructions to transform, anonymize, synthesize, and tag one or both merchants and payment agents when parsing the associated proprietary format financial transaction data input and generating from it an output having consistently formatted structured data including transformed, anonymized, synthesized, and tagged data that is suitable for loading into the cloud database identified in the application settings configuration information; initiating a transfer of the output to the cloud storage resource identified in the application settings configuration information; providing an instruction to load the output into the cloud database from the cloud storage resource; and orchestrating jobs to run on the transformed, anonymized, synthesized, and tagged data loaded into the cloud database based on the one or more hierarchical job tiers and preconfigured job queries specified in the job settings configuration information.

Additional aspects and advantages will be apparent from the following detailed description of embodiments, which proceeds with reference to the accompanying drawings.

BRIEF DESCRIPTION OF THE DRAWINGS

FIG. 2 is a screenshot of contents of a text file showing an example of a proprietary format of data input represented in the left-side of FIG. 1.

FIGS. 3 and 4 are illustrations of screenshots showing dashboard and data menus accessible via a DRE operational dashboard shown in FIG. 1.

FIG. 5 is a block diagram of computing devices configured to provide DRE services and features shown in FIG. 1.

FIGS. 6A, 6B, and 6C are screenshots showing an example of an application settings configuration file defining application settings configuration information for configuring an instance of a DRE application (or simply, DRE) by identifying, among other things, input and output locations.

FIGS. 7A, 7B, 7C, 7D, 7E, 7F, 7G, 7H, 7I, 7J, 7K, and 7L are screenshots showing an example of an input-file settings configuration file providing data-transformation settings configuration information for configuring DRE by specifying, among other things, instructions to transform, anonymize, synthesize, and merchant or payment agent tag one or more data inputs.

FIGS. 8A, 8B, 8C are screenshots showing an example of a job settings configuration file providing job settings configuration information for configuring DRE by specifying, among other things, preconfigured queries to run, in one or more hierarchal job tiers, on data output loaded in a cloud database.

FIG. 9 is a block diagram of a computing device, according to one embodiment.

DETAILED DESCRIPTION OF EMBODIMENTS

Figure 1:
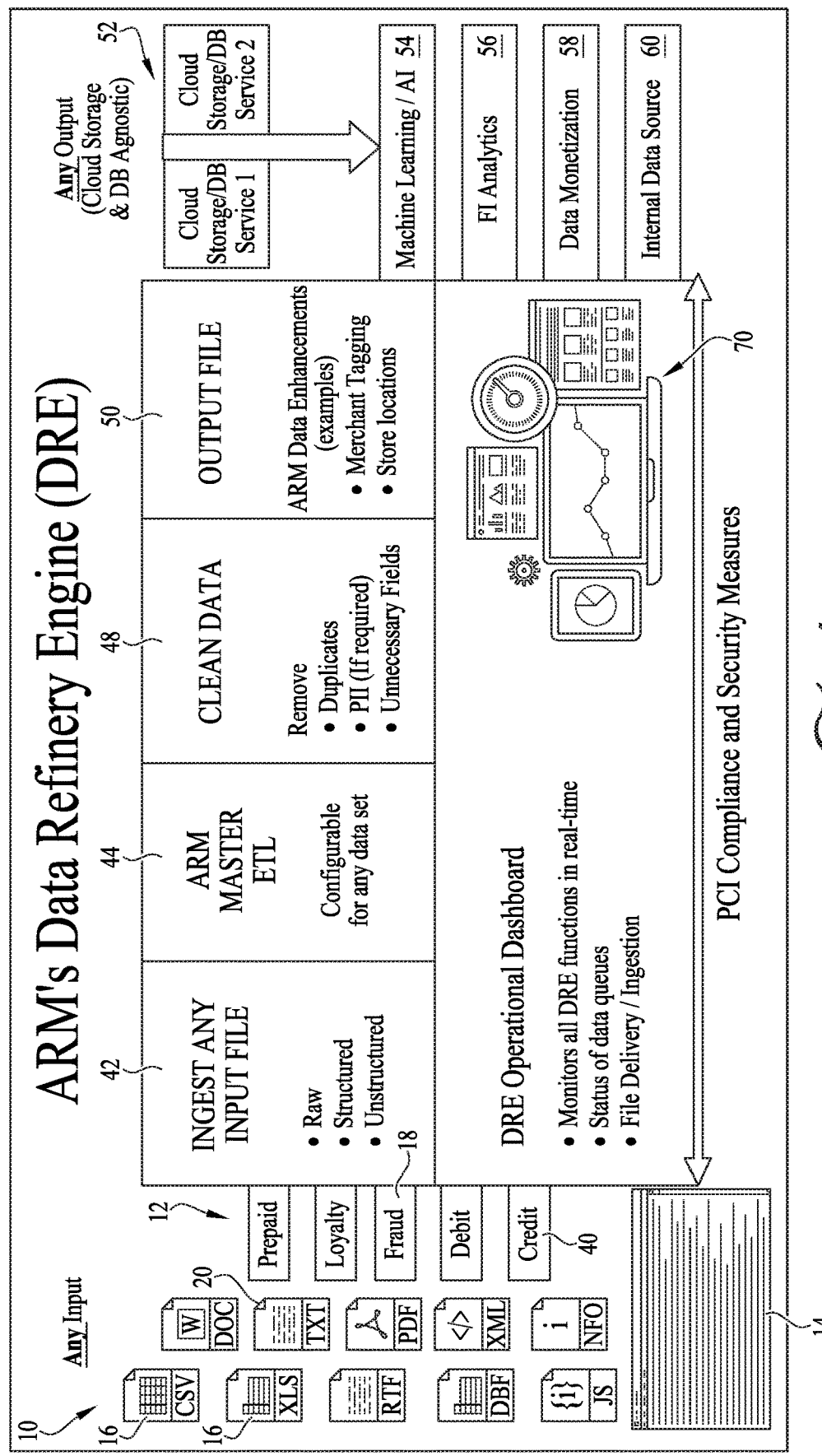
FIG. 1 is a block diagram of a master extract, transform, and load (ETL) application, which is also referred to as a Data Refinery Engine (DRE) developed by ARM Insight, Inc. of Portland, Ore.

FIG. 1 provides an overview of DRE features. A left side 10 represents financial transaction data received at unpredictable times from multiple data sources 12 providing disparate proprietary data formats 14 (see e.g., format of FIG. 2) and input types 16. For example, a first financial institution data source is a fraud investigation group 18 providing a text file 20 with contents 22 shown in FIG. 2. Furthermore, financial transaction data can be made available from data sources other than financial institutions. For example, an email receipt company may provide financial transaction data.

As shown in FIG. 2, contents 22 include raw financial transaction data having a proprietary data format. The format is usually different for different data sources, but in the example of contents 22, data fields are delimited by pipe characters 24 establishing delimiter-separated values.

Some data fields include combined date and time data 26, in which the date is represented as hyphen-delimited four-digit year, two digit month, and two-digit day, and in which the time is represented as a colon-delimited 24-hour clock that includes milliseconds. Other data fields include salted hashes or otherwise encrypted (i.e., obfuscated) personally identifiable information (PII) such as a person's encrypted name 28, address 30, or other information.

Also shown in FIG. 2 are other varieties of data fields including transaction details such as transaction amount 31, merchant, and payment agent, and. For example, payment agent 32 is "PAYPAL," which is the raw data indicating a transaction was processed by PayPal Holdings, Inc. Other data sources, however, represent this payment agent using "PHI" or other indicator. Similarly, payment agent 33 is "SQ," which indicates a transaction was processed by Square, Inc., whereas other raw data may include "Square" or "SI." DRE recognizes these disparate payment agent identifiers and tags them using a consistent identifier for each agent. Thus, any Square-processed transaction is tagged with "Square, Inc.," any PayPal-process transaction is tagged with "PayPal Holdings, Inc.," and so forth. Likewise, a "WALMART COM" merchant identifier 34 and "Wal-Mart" merchant identifier 35, and similar disparate identifiers are consistently tagged with "Walmart Inc." or other appropriate merchant tag.

The data format shown in FIG. 2 is just an example, and specific formats can change substantially from one source to the next. For example, fraud investigation group 18 deploys the aforementioned combined date and time in a single field, but a credit transaction source 40 (FIG. 1) might instead use a Unix time format across one or more data fields, include a two-digit year, or represent a transaction time according to some other custom format. Likewise, transaction amounts may be base-ten numbers, hexadecimal amounts, or some other custom form. In some embodiments, PII is provided in plain text or in other forms.

Multiple file types are represented by the different file extensions shown in FIG. 1 because data input types 16 may change from one source to the next. Furthermore, a data source can provide multiple different input types in connection with a single job. Accordingly, FIG. 1 shows how DRE is capable of receiving 42 any input file. In some other embodiments, data input types include streaming data or other non-file types.

To accommodate different formats and input types, each instance of DRE 44 executing on a computing device at a premises of the data source (or remotely, e.g., at servers of ARM Insight, Inc.) is configurable for each corresponding financial institution source providing an associated proprietary format financial transaction data input. An example configuration is shown and described later with reference to FIGS. 6A-8B. But in general, the configuration provides tailored instructions for cleaning data 48 by parsing, transforming, refining, and supplementing data input preparatory to saving it as a clean, standard data output 50 on a selectable one of multiple cloud storage resources 52 from which data output 50 is loaded to a massively parallel processing (MPP) cloud database. Preconfigured hierarchical (i.e., nested or dependent) database queries, which are collectively called jobs, may then be run to generate reports and insights for the data source or third parties. Accordingly, DRE has widespread applicability in terms of machine learning and artificial intelligence 54, analytics and business intelligence 56 (i.e., providing reports and dashboards), data monetization 58 (i.e., selling data to third parties), direct access to refined/enhanced client data 60 for, e.g., internal departments at a client company (such as fraud department of the client) or external customers of the client (not shown).

More specifically in the financial transaction context, a master ETL configuration provides instructions to transform, anonymize, synthesize, and tag one or both merchants and payment agents when parsing the associated proprietary format financial transaction data input and generating from it an output having consistently formatted structured data including transformed, anonymized, synthesized, and tagged data that is suitable for loading into the cloud database identified in the application settings configuration information. In some embodiments, the configuration also provides for orchestrating jobs to run on the transformed, anonymized, synthesized, and tagged data loaded into the cloud database based on the one or more hierarchical job tiers and preconfigured job queries.

The data is maintained in accordance with the Payment Card Industry Data Security Standard (PCI DSS) because, in some embodiments, the DRE application is run in accordance with PCI Level 1 compliance. In other words, DRE can be used in conjunction with credit/debit card data because the data is received and processed by DRE behind a PCI-compliant firewall. The refined/enhanced output from DRE can be optionally delivered to a PCI-compliant destination (e.g., for sensitive data) or a non-PCI-compliant destination (e.g., for data monetization where all sensitive data is removed).

Figure 3:
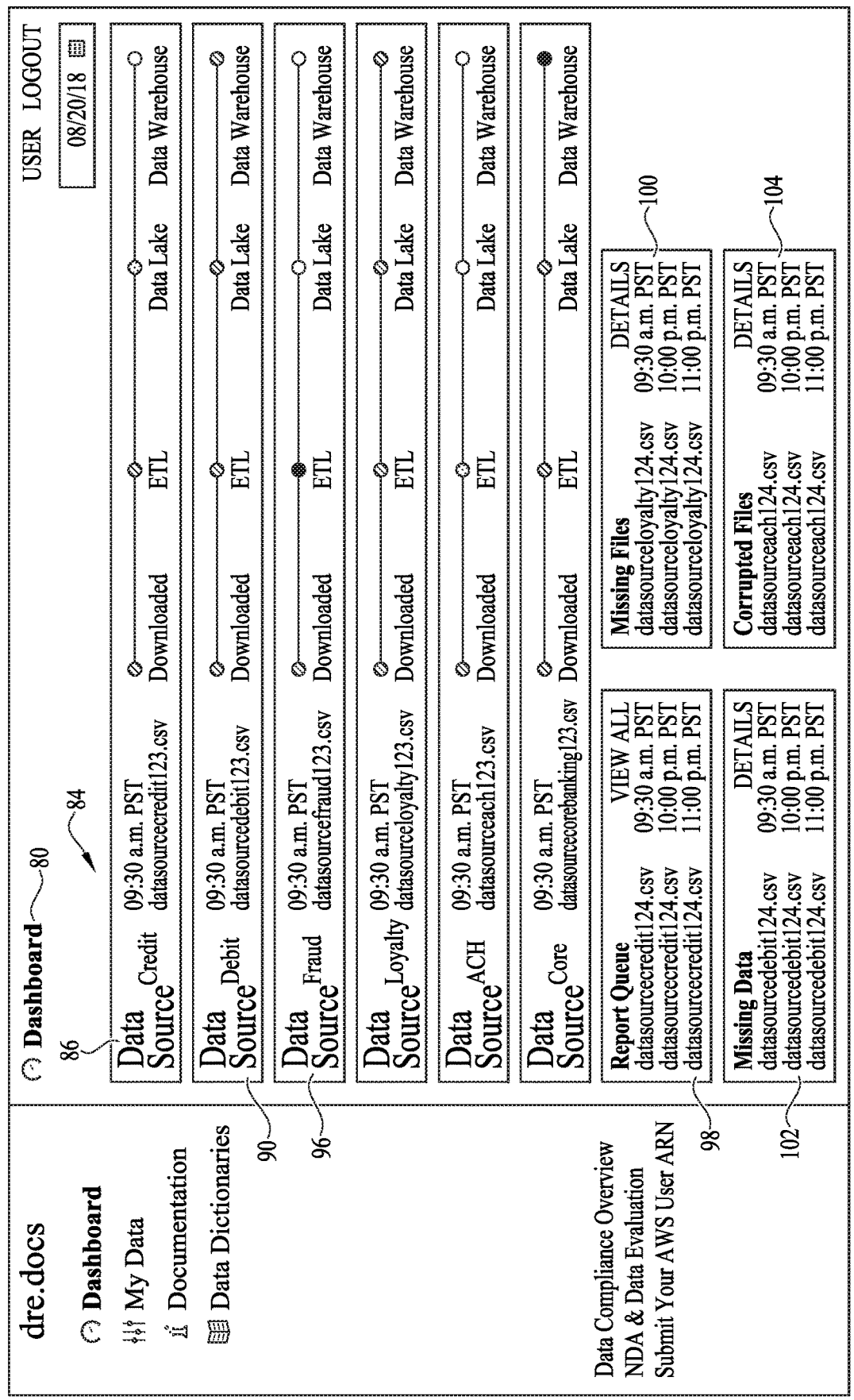

In some embodiments, DRE operates on vast amounts of data inputs having hundreds of thousands of lines of data. Accordingly, DRE includes an operational dashboard 70 for monitoring the ETL process and status of the data inputs. FIGS. 3 and 4, for example, show a dashboard 80 and a data overview 82 menus. Dashboard 80 shows the status of six different first financial institution data sources 84 providing disparate proprietary data formats and input types.

In a first example, a first source 86 labeled "Data Source$^{Credit}$" provided to DRE at 9:30 a comma separated variable (CSV) file titled "datasourcecredit123.csv." This file sets forth data representing credit card transactions. Dashboard 80 indicates that the file was downloaded, processed by DRE, and the data output has not yet been saved to a cloud storage resource (labeled as a Data Lake) nor loaded to a cloud database (labeled as a Data Warehouse).

In a second example, a second source 90 labeled "Data Source$^{Debit}$" provided to DRE at 9:30 a CSV file titled "datasourcedebit123.csv." This file sets forth data representing debit card transactions. Dashboard 80 indicates that the file was downloaded, processed by DRE, and the data output has been saved to the Data Lake and loaded to the Data Warehouse.

In a third example, a second source 96 labeled "Data Source$^{Fraud}$" provided to DRE at 9:30 a CSV file titled "datasourcefraud123.csv." This file sets forth data representing potentially fraudulent transactions (see e.g., FIG. 2).

Dashboard 80 indicates that the file was downloaded, processed by DRE, and there was an error in the ETL process. Accordingly, at least a portion of the data output is not available to be saved to the Data Lake nor loaded to the Data Warehouse.

Dashboard 80 also provides status indicators for a report queue 98, missing files 100, missing data 102, and corrupted files 104. Specifically, report queue 98 shows processed files. Missing files 100 shows the files that were expected, but were not delivered by a data source at the scheduled time. Missing data 102 shows instances in which the number of transactions received were outside an expected range. Corrupted files 104 shows that a file was received but had corrupted data that could not be processed.

Data overview 82 provides a user interface that a data source or permitted third party may use to quickly assess its data and gather additional insights about it. For example, a first pie chart 108 shows proportions of credit and debit transactions included in the data. A second pie chart 110 shows age groups of cardholders. Geographical information 112 is also provided.

FIG. 5 shows computing devices 120 configured to provide DRE services and features shown in FIG. 1. A customer computing device 122 may comprise an online server or local workstation located on premises of a data source. Because some financial institution data sources are reluctant to convey sensitive, i.e., PII, information over computer networks, DRE is available to execute on local computers located on the site of the data provider. In other embodiments, DRE runs on local computers of ARM Insight, Inc. and data input is streamed or delivered as files by data sources.

Before data is ready for transmission to a cloud storage resource 124, DRE performs transformations 126, anonymizations 128 (including obfuscations), synthetic data operations 130, and optional tagging 134. Data output, which may include obfuscated PII, is then optionally compressed 136 (e.g., by DRE's internal compression algorithms or by those of adjunct software) and saved to a cloud storage resource such as Amazon Web Services (AWS) S3, Google Could Storage, or others.

Obfuscation should be understood to mean a data transformation by which data input is mapped from its initial form to an obfuscated form for the data output. Accordingly, the transformation may be reversible provided that the particular mapping algorithm is known. An example of performing data obfuscation is a salted hash function and (more generally) encryption. Other techniques may also be used to anonymize PII.

In contrast, synthesizing data should be understood to mean a non-reversible process through which data input is converted to synthetic data that (for analytical purposes) bears a selectable, statistically significant relationship to the data input. The data input is essentially randomized such that noise is introduced under desired randomization constraints.

Once a compressed version of the data output is saved to selectable cloud storage resource, computing device 122 causes the data to be loaded 140 into tables of an MPP database 144, such as those available from Amazon Redshift, Google BigQuery, and Snowflake Computing. These platforms provide data warehouse capabilities accessible to a software-as-a-service (SaaS) server 150 that runs jobs and provides reports and monitoring services, such as those shown in FIGS. 3 and 4. For the purposes of this disclosure, the terms database and data warehouse are used interchangeably, although skilled persons will appreciate that there are distinctions between functions handled at the MPP database and the data warehouse stages. For example, a data warehouse is typically used for non-real time reporting and analytics functions.

In some embodiments, SaaS server 150 and computing device 122 are the same device or are controlled by the same entity. For example, in one embodiment, SaaS server 150 and computing device 122 are deployed at or controlled by ARM Insight, Inc. and form part of a common PCI DSS compliant data processing system. In other embodiments, SaaS server 150 is computing device 122 and is not accessible through a network connection with third parties (e.g., a non-SaaS embodiment). Additional details of computing devices are described later with reference to FIG. 9.

FIGS. 6A, 6B, and 6C show an example of application settings configuration information 160 included in an application settings configuration file. When DRE executes, it reads information 160 from this file so as to configure the instance of the application.

At the top of FIG. 6A, credentials 162 for cloud storage resources and databases are provided such that DRE may access different target databases and storage resources.

Directory and file locations 164 are provided such that DRE is capable of identifying where data input is provided, data output is to be delivered, events are logged, and other configuration files are located. For example, a location of a data-transformation settings configuration file 166 is identified. "Data-transformation settings configuration information" is called a "file settings configuration file" in the example of FIG. 6A, but because data input need not be a "file" and configuration information need not be saved in a "configuration file," more general terminology is used in this disclosure.

FIG. 6B shows processing configuration settings 168, called "GlobalSettings," are included. These settings provide instructions for how DRE should process and handle data. For example, a target database 170 for the data is identified. A number of job tiers (i.e., number of hierarchical levels of queries) 172 is selected. Other processing configuration settings 168 control processing resource allocation and pre- and post-processing activities.

The bottom of FIG. 6B and all of FIG. 6C show additional configuration information for statistical analysis settings 180, email alerting 182, and logging setting 184. Below logging settings 184 are custom file settings 186.

Custom file settings 186 identify supplemental information that is specific to a specific data source, but applicable to any data input provided by that source. For example, a data source may have a propriety format for representing transaction amounts, and that format is use for each data file provided by the data source. Accordingly, a supplemental conversion file 190 identified under custom file settings 186 sets forth a mapping from the proprietary format to a standard monetary format. Likewise, there are mappings for zip codes to census tracks 192, payment agents to a standard payment agent identifier (e.g. PayPal and Venmo are mapped to PayPal) 194, and merchants (including subsidiaries and affiliates) to an overarching merchant (e.g., Pizza Hut and KFC are mapped to Yum Brands) 196.

FIGS. 7A, 7B, 7C, 7D, 7E, 7F, 7G, 7H, 7I, 7J, 7K, 7L show an example of data-transformation settings configuration information 220 included in a file settings configuration file. When DRE executes, it reads information 220 from this file so as to configure the data-transformation, anonymization, synthetic data production, and merchant or payment agent tag supplementation.

FIG. 7A shows a portion of common file settings 222 (continued on FIG. 7B) indicating how a file named "ARM_FraudCustomers" should be parsed. For example, common file settings 222 indicates that the file input includes no delimiter 224 and specifies multiple data fields 230 located at different positions in a line of data, with each data field having a defined numbers of characters (i.e., its length).

FIG. 7A also shows that common file settings 222 includes processing optimization configurations. For example, batch size 232 indicates that 100,000 lines of raw data may be read from a data source (i.e., file), stored in memory while being processed serially or in parallel (e.g., 20 lines at a time) by different processors or cores, and then written to an output file. This parameter thereby allows DRE to manage memory utilization and read and write access times.

Similarly, a split file "true" 234 and lines per file 236 allow DRE to split a file having, for example, one billion transactions into multiple smaller files having three million transactions in each smaller file. Each smaller file can then be processed by a different computing device acting in parallel with other computing devices, which greatly accelerates the speed at which these files are accessed and processed.

Some data fields 230 are identified as being sensitive fields 240 (FIG. 7B), which are to be hashed in this example because of a "true" value is configured for a hash configuration setting 244.

FIG. 7B shows a portion of custom file settings 250 indicating how certain data fields defined by common file settings 222 should be converted. For example, in a data and time field 252, there are instructions for converting periods to colons. Similarly, a four-digit year is to be extracted 254 from a birthdate. PII fields are to be converted using a hash code instruction (not show).

Continuing on FIG. 7C, a zip code field is to be converted 260 to a census track code. FIG. 7C also shows certain derived file settings 270. For example, a new field is to be created 272 based on a portion of an existing field, or based on a concatenation of portions of multiple fields. Derived file settings 270 also include instructions for creating a new field 274 indicating a payment agent or a merchant, as shown in FIG. 7G. In another embodiment, tagging need not be a derived field but can be a custom file setting for converting an existing field (e.g., swapping its proprietary merchant data with merchant tag).

FIG. 7D shows another set of common file settings 280 for parsing a different file named "ARM_ImportCreditAuthPost." In other words, a data source might provide multiple data inputs (i.e., multiple files) that form part of a common job. The files themselves, however, have different configurations, as set forth in the remainder of information 220 shown on FIGS. 7E, 7F, 7G, 7H, 7I, 7J, 7K, and 7L, which are similar to the aforementioned description of information 220, with additional synthetic data features noted as follows.

FIGS. 7G and 7J shows how certain data is to be synthesized 290. For example, a transaction amount field is randomized by varying data amounts under this field randomly between ±2.5% (or another selectable amount). Similar randomizations are applied by randomly adding or subtracting up to 900 seconds (or other selectable amount) from the transaction time. Merchant descriptions are also optionally scrambled or otherwise redacted.

In some embodiments, derivation and synthetization processing steps can be performed sequentially. For example, some raw data includes date and time data in two separate fields. Thus, depending on the configuration, DRE can first derive a new combined date-time field. Data in the new date-time field is then used to generate new synthetic date-time data stored in the date-time field, and the original date and time data is either discarded or hashed, depending on the desired configuration and level of security.

Once data is loaded to a cloud database, it is clean and available to be automatically queried by DRE so as to generate a report and thereby complete a desired job. Some queries can be performed in parallel, whereas other queries are to be performed sequentially due to, e.g., inherent dependency where one subsequent set of queries relies upon an output of prerequisite set of queries DRE accommodates such parallel and sequential performance using a set of hierarchical job tiers in a directory. For example, a directory may include ten subdirectories labeled, for example, folders one through ten representing ten tiers. In the first folder, there are multiple job files, with each job file representing one or more queries that may be run on a particular table and in parallel with the other queries under that first folder. After those queries are run, then DRE runs the queries from the second folder, and so forth for all ten subdirectories.

FIGS. 8A, 8B, and 8C show an example of job settings configuration information 300 included in a job settings configuration file. When DRE executes, it reads information 300 from this file so as to orchestrate jobs to run on the transformed, anonymized, synthesized, and tagged data loaded into the cloud database based on the one or more hierarchical job tiers and preconfigured job queries specified in information 300. For example, FIGS. 8A and 8B shows that a job can be scheduled 302 to run daily according to a given schedule. In another embodiment, a job can be run dynamically as soon as data output is loaded. This is advantageous because data sources are occasionally late in terms of meeting an agreed upon or anticipated data input delivery time, but the data source team still expects to receive a report once the data is processed and available.

Embodiments described herein may be implemented in any suitably configured hardware and software resources of computing device 320, as shown in FIG. 9. And various aspects of certain embodiments may be implemented using hardware, software, firmware, or a combination thereof, for reading instructions from a machine- or computer-readable non-transitory storage medium and thereby performing one or more of the methods realizing the disclosed algorithms and techniques. Specifically, computing device 320 includes one or more processors 324, one or more memory/storage devices 326, and one or more communication resources 338, all of which are communicatively coupled via a bus or other circuitry 340.

Processor(s) 324, may include, for example, a processor 342 (shared, dedicated, or group), an optional processor (or additional processor core) 344, an ASIC or other controller to execute one or more software or firmware programs, a combinational logic circuit, or other suitable components that provide the described functionality including parallel processing of lines of data.

Memory/storage devices 326 may include main memory, cache, flash storage, or any suitable combination thereof. A memory device 326 may also include any combination of various levels of non-transitory machine-readable memory including, but not limited to, electrically erasable programmable read-only memory (EEPROM) having embedded software instructions (e.g., firmware), dynamic random-access memory (e.g., DRAM), cache, buffers, or other memory devices. In some embodiments, memory may be shared among the various processors or dedicated to particular processors.

Communication resources 338 include physical and network interface components or other suitable devices to communicate via a network 348 with one or more peripheral devices 350 (e.g., programming workstation) or one or more other devices collectively storing data 352 described previously. Communication resources 338 may also include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 354 may comprise software, a program, an application, an applet, an app, or other executable code for causing at least any of processor(s) 324 to perform any one or more of the methods discussed herein. For example, instructions 354 facilitate receiving (e.g., via communication resources 338) a data from various data sources for processing. Instructions 354, for example, include .Net and C libraries providing machine-readable instructions that, when executed by a processor, cause processors of to perform preparing a method of preparing financial transaction data, received at unpredictable times from multiple data sources providing disparate proprietary data formats and input types, so that the financial transaction data is readily available to be monetized.

Instructions 354 may reside, completely or partially, within at least one of processor(s) 324 (e.g., within a processor's cache memory), memory/storage devices 326, or any suitable combination thereof. Furthermore, any portion of instructions 354 may be transferred to computing device 324 from any combination of peripheral devices 350 or the other devices storing data. Accordingly, memory of processors(s) 324, memory/storage devices 326, peripheral devices 350, and the other devices are examples of computer-readable and machine-readable media.

Instructions 354 may also, for instance, comprise one or more physical or logical blocks of computer instructions, which may be organized as a routine, program, object, component, data structure, text file, or other instruction set facilitating one or more tasks or implementing particular data structures or software modules. A software module, component, or library may include any type of computer instruction or computer-executable code located within or on a non-transitory computer-readable storage medium. In certain embodiments, a particular software module, component, or programmable rule may comprise disparate instructions stored in different locations of a computer-readable storage medium, which together implement the described functionality. Indeed, a software module, component, or programmable rule may comprise a single instruction or many instructions, and may be distributed over several different code segments, among different programs, and across several computer-readable storage media. Some embodiments may be practiced in a distributed computing environment where tasks are performed by a remote processing device linked through a communications network.

Skilled persons will now appreciate that many changes may be made to the details of the above-described embodiments without departing from the underlying principles of the invention. For example, the aforementioned configuration information can be solicited from a data source team using a graphical user interface that then generates the set of configuration files or accesses the settings through a compiled object. The scope of the present invention should, therefore, be determined only by the following claims.

The invention claimed is:

1. A method, performed by a computing device executing an instance of a master extract, transform, and load (ETL) application, of preparing financial transaction data received at unpredictable times from multiple data sources providing disparate proprietary data formats and input types, the method comprising:

for each data source providing an associated proprietary format financial transaction data input, configuring a corresponding instance of the master ETL application with application settings configuration information, the application settings configuration information identifying a cloud storage resource and a cloud database, a location in which the associated proprietary format financial transaction data input is to be delivered, a location of data-transformation settings configuration information, and a location of job settings configuration information specifying preconfigured queries to run in one or more hierarchical job tiers;

in response to receiving the associated proprietary format financial transaction data input, processing the associated proprietary format financial transaction data input based on the data-transformation settings configuration information identified by the application settings configuration information, the data-transformation settings configuration information specifying instructions to transform, anonymize, synthesize, and tag one or both merchants and payment agents when parsing the associated proprietary format financial transaction data input and generating therefrom an output having consistently formatted structured data including transformed, anonymized, synthesized, and tagged data for loading into the cloud database identified in the application settings configuration information;

initiating a transfer of the output to the cloud storage resource identified in the application settings configuration information;

providing an instruction to load the output into the cloud database from the cloud storage resource; and orchestrating jobs to run on the transformed, anonymized, synthesized, and tagged data loaded into the cloud database based on the one or more hierarchical job tiers and preconfigured job queries specified in the job settings configuration information.

2. The method of claim 1, in which the processing further comprises transforming the associated proprietary format financial transaction data input by defining data fields with the data-transformation settings configuration information.

3. The method of claim 2, in which the data fields include sensitive data fields that relate to personally identifiable information (PII), and the processing further comprises anonymizing PII data present in the sensitive data fields.

4. The method of claim 2, in which the data fields include synthetic data fields that relate to transaction amounts and times, and the processing further comprises synthesizing data by controllably randomizing the transaction amounts and times in the synthetic data fields based on randomization constraints defined in the data-transformation settings configuration information.

5. The method of claim 1, in which the processing further comprises transforming the associated proprietary format financial transaction data input by converting a format as defined in the data-transformation settings configuration information.

6. The method of claim 1, in which the processing further comprises transforming the associated proprietary format financial transaction data input by replacing data under a field of the input with a different data under the field that is provided in the output as defined by a mapping in the data-transformation settings configuration information.

7. The method of claim 1, in which the processing further comprises transforming the associated proprietary format financial transaction data input by extracting a portion of data under a field of the input into a corresponding field of the output as defined in the data-transformation settings configuration information.

8. The method of claim 1, in which the processing further comprises transforming the associated proprietary format financial transaction data input by masking data under a field as defined in the data-transformation settings configuration information.

9. The method of claim 1, in which the processing further comprises transforming the associated proprietary format financial transaction data input to include derived data fields representing concatenated data under multiple data fields.

10. The method of claim 9, in which the concatenated data identify a payment agent for application of a payment agent tag under a corresponding derived data field.

11. The method of claim 9, in which the concatenated data identify a merchant for application of a merchant tag under a corresponding derived data field.

12. The method of claim 1, further comprising, preparatory to transferring the output, obtaining a compressed version of the output for transfer to the cloud storage resource.

13. The method of claim 1, in which the job settings configuration information includes a first file forming a first job tier and a second file forming second job tier, the first job tier including queries configured to be ran before those of the second job tier.

14. The method of claim 1, in which the job settings configuration information defines jobs to be run asynchronously in response to loading of the output.

15. The method of claim 1, in which the application settings configuration information defines a location of a pattern matching file for converting data formats.

16. The method of claim 1, in which the application settings configuration information defines a location of a pattern matching file for identifying merchants and normalizing them in the output.

* * * * *